US008755840B2

(12) United States Patent    (10) Patent No.: US 8,755,840 B2
Choi                          (45) Date of Patent: Jun. 17, 2014

(54) DATA EXECUTION CONTROL METHOD AND SYSTEM THEREFOR

(75) Inventor: Tae Hwa Choi, Seosan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1478 days.

(21) Appl. No.: 11/936,228

(22) Filed: Nov. 7, 2007

(65) Prior Publication Data

US 2008/0113651 A1    May 15, 2008

(30) Foreign Application Priority Data

Nov. 9, 2006  (KR) ......................... 10-2006-0110682

(51) Int. Cl.
*H04M 1/00* (2006.01)

(52) U.S. Cl.
USPC ........... 455/558; 455/410; 455/411; 455/418; 455/550.1

(58) Field of Classification Search
USPC .............. 455/410–411, 557, 558, 445, 435.1, 455/422.1, 428, 453, 418–420, 550.1, 417, 455/433
See application file for complete search history.

(56) References Cited

U.S. PATENT DOCUMENTS

| | | | | |
|---|---|---|---|---|
| 4,882,474 A * | 11/1989 | Anderl et al. | ................ | 235/380 |
| 5,842,124 A * | 11/1998 | Kenagy et al. | ................ | 455/418 |
| 5,884,168 A * | 3/1999 | Kolev et al. | ................ | 455/432.1 |
| 5,913,175 A * | 6/1999 | Pinault | ........................ | 455/558 |
| 5,999,811 A * | 12/1999 | Molne | ........................ | 455/432.3 |
| 6,119,020 A * | 9/2000 | Miller et al. | | |
| 6,141,563 A * | 10/2000 | Miller et al. | .................. | 455/558 |
| 6,141,564 A * | 10/2000 | Bruner et al. | ................. | 455/558 |
| 6,799,155 B1 * | 9/2004 | Lindemann et al. | ............ | 703/24 |
| 7,316,030 B2 * | 1/2008 | Audebert et al. | ............... | 726/14 |
| 7,941,185 B2 * | 5/2011 | Ban et al. | ...................... | 455/558 |
| 8,032,181 B2 * | 10/2011 | Hauck et al. | .................. | 455/558 |
| 8,577,413 B2 * | 11/2013 | Kim | ................ | 455/558 |
| 8,588,749 B1 * | 11/2013 | Sadhvani et al. | .......... | 455/412.2 |
| 2002/0081179 A1 * | 6/2002 | Vallstrom | ..................... | 414/333 |
| 2004/0005911 A1 * | 1/2004 | Guirauton et al. | ........... | 455/558 |
| 2004/0152445 A1 * | 8/2004 | Muller | ......................... | 455/410 |
| 2004/0203601 A1 * | 10/2004 | Morriss et al. | ................ | 455/411 |
| 2005/0170813 A1 * | 8/2005 | Choi | ............................. | 455/411 |
| 2005/0181829 A1 * | 8/2005 | Cho et al. | ...................... | 455/558 |
| 2006/0183462 A1 * | 8/2006 | Kolehmainen | ................ | 455/411 |
| 2007/0191057 A1 * | 8/2007 | Kamada | ........................ | 455/558 |
| 2009/0029736 A1 * | 1/2009 | Kim et al. | ..................... | 455/558 |

FOREIGN PATENT DOCUMENTS

KR    10-2006-0023711 A    3/2006

\* cited by examiner

*Primary Examiner* — Sharad Rampuria
(74) *Attorney, Agent, or Firm* — Jefferson IP Law, LLP

(57) ABSTRACT

A data execution control method and system for a mobile phone are provided. The execution method and system control the execution of user data stored in the mobile phone on the basis of access/execution authentication levels assigned to multiple Subscriber Identity Modules (SIMs). The data execution control method includes receiving a key input requesting execution of a user data, reading subscriber information from the SIM, determining whether an execution password corresponding to the subscriber information among previously registered execution passwords and executing the user data if an execution password corresponding to the subscriber information.

25 Claims, 6 Drawing Sheets

DATA EXECUTION CONTROL METHOD AND SYSTEM THEREFOR

PRIORITY

This application claims the benefit under 35 U.S.C. §119(a) of a Korean patent application filed in the Korean Intellectual Property Office on Nov. 9, 2006 and assigned Serial No. 2006-0110682, the entire disclosure of which is hereby incorporated by reference.

BACKGROUND OF THE INVENTION

1. Field of the Invention

The present invention relates to a system and method for the control of data execution. More particularly, the present invention relates to a data execution control method and system that are capable of controlling the execution of specific user data on the basis of access authentication levels assigned to multiple Subscriber Identity Modules (SIMs).

2. Description of the Related Art

With the advance of mobile computing and wireless communication technologies, mobile phones have been developed to accommodate various mobile communication services across networks. Such mobile phones have expanded user mobility so as to provide a user with voice and data connectivity anytime and anywhere, even on the move. Also, advanced applications and extended storage capability of such mobile phones allow the user to perform various Internet-based services such as searching for information (for example, stock exchange, weather, sports, and traffic information), chatting and playing games online, and downloading multimedia contents (for example, video and audio files).

In certain wireless communication technologies, a Subscriber Identity Module (SIM) is used for storing network specific information used to authenticate and identify subscribers on the network. The SIM is a removable smart card such that the user can change phones by simply removing the SIM card from one mobile phone and inserting it into another mobile phone.

In other words, a single mobile phone can be used by multiple users simply by each user inserting their own SIM card. However, in this case, the user data owned by a specific user (for example, private information and pay contents files) may be unwantedly shared with other users. That is, a secondary user can access the data, which is stored by a primary user in the mobile phone, by inserting his/her own SIM card which is different from the primary user's.

In the case of pay contents, since the contents paid by one user may be played or rendered by other non-paid users having different SIM cards, such content share can be a loss in view of the content provider.

Also, sharing a mobile phone with multiple users having different SIM cards may cause another problem in association with Digital Rights Management (DRM) contents.

If the DRM content purchased by a user is allowed to be played only a limited number of times and the DRM content is played by other users accidentally or intentionally, the content play times may run out, thereby wasting money in view of the user who purchased the DRM content.

Also, the conventional SIM-based mobile phone is disadvantageous in terms of privacy, since a user's specific private data can be exposed by other SIM card owners.

SUMMARY OF THE INVENTION

An aspect of the present invention is to address the above-mentioned problems and/or disadvantages and to provide at least the advantages described below. Accordingly, as aspect of the present invention is to provide a data execution control method and system for a SIM-based mobile phone that is capable of controlling access user data on the basis of access authentication levels assigned to SIMs.

Another aspect of the present invention is to provide a data execution control method and system for a SIM-based mobile phone that allows registering SIMs to operate with the mobile phone.

Yet a farther aspect of the present invention is to provide a data execution control method and system for a SIM-based mobile phone that allow the mobile phone to identify an attached SIM and permit access to user data allowed for the identified SIM.

In accordance with an aspect of the present invention, a data execution control method for a mobile phone activated by a Subscriber Identity Module (SIM) is provided. The control method includes receiving a key input requesting execution of a user data, reading subscriber information from the SIM, determining whether an execution password corresponding to the subscriber information among previously registered execution passwords and executing the user data if an execution password corresponding to the subscriber information.

In accordance with another aspect of the present invention, a data execution control method for a mobile phone activated by a Subscriber Identity Module (SIM) is provided. The control method includes determining, if an execution request for a user data is input, whether a data execution restriction mode is enabled, comparing, if the data execution restriction mode is enabled, a subscriber information read from the SIM and previously registered execution passwords, executing, if one of the execution passwords is corresponding to the subscriber information, the user data and rejecting, if no execution password is corresponding to the subscriber, execution of the user data.

In accordance with yet another aspect of the present invention, a data execution control method for a mobile phone activated by a Subscriber Identity Module (SIM) is provided. The control method includes determining, if an execution request for a user data is input, whether a data execution restriction mode is enabled, determining, if the data execution restriction mode is enabled, whether a subscriber information read from the SIM includes a first execution password, determining, if the subscriber information includes the first execution password, whether the subscriber information includes a second execution password and executing, if the subscriber information includes the second execution password, the user data.

In accordance with another aspect of the present invention, a data execution control method for a mobile phone activated by a Subscriber Identity Module (SIM) is provided. The control method includes determining, if an execution request for a user data is input, whether at least one execution password is registered to the user data, determining, if at least one execution password is registered to the user data, whether a restriction status of the user data is on or off, collecting, if a restriction status of the user data is on, subscriber information from the SIM, determining whether the subscriber information includes the at least one execution password, executing, if the subscriber information includes the at least one execution password, the user data and rejecting, if the subscriber information does not includes the at least one execution password, execution of the user data.

In accordance with still another aspect of the present invention, a data execution control method for a mobile phone activated by a Subscriber Identity Module (SIM) is provided.

The control method includes determining, if a key input is detected while the mobile phone operates in a data execution restriction mode, whether the key input is a SIM registration mode request, collecting, if the key input is a SIM registration mode request, subscriber information, registering the subscriber information as an execution password for executing at least one user data selected by a user input, entering, if the key input is not a SIM registration mode request, an execution password editing mode with presentation of a per-user data option and a per-SIM option for selection, displaying, if a per-user data option is selected, a user data list having the user data registered for the data execution restriction mode, editing at least one execution password registered to the user data selected from the user data list in response to user input, displaying, if a per-SIM option is selected, a SIM list having subscriber information items registered for the data execution restriction mode and editing the user data registered to the subscriber information selected from the SIM list.

In accordance with another aspect of the present invention, a mobile phone activated by a Subscriber Identity Module (SIM) is provided. The mobile phone includes a SIM interface, a memory unit for storing user data with execution setting information and a control unit for registering at least one execution password to the user data and for controlling execution of the user data on the basis of execution password and subscriber information of the SIM card connected through the SIM interface.

BRIEF DESCRIPTION OF THE DRAWINGS

The above and other aspects, features and advantages of exemplary embodiments of the present invention will be more apparent from the following detailed description in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions, constructions and structures are omitted for clarity and conciseness.

Figure 1:
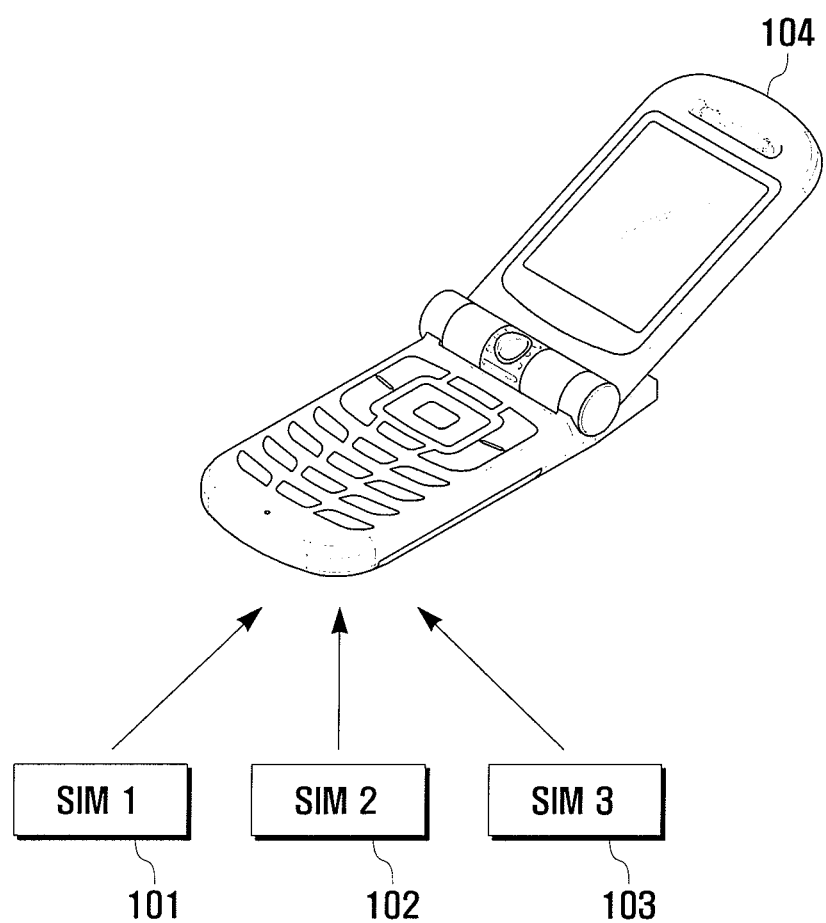
FIG. 1 is a perspective view illustrating an exemplary mobile phone having a SIM card interface.

FIG. 1 is a perspective view illustrating an exemplary mobile phone having a SIM card interface.

Referring to FIG. 1, the mobile phone 104 is provided with a SIM card interface such that multiple SIM cards 101, 102 and 103 can be selectively attached to the mobile phone 104.

Although the data execution control method and system is described using a SIM card in the following description, the present invention is not limited to the SIM-based mobile phone. For example, the data execution control method and system of the present invention can be applied to other systems such as mobile phones operating with any type of detachable subscriber identity modules such as Universal SIM (USIM).

The mobile phone 104 is activated by inserting one of the SIM cards 101, 102 and 103. Typically, user data such as private data and multimedia contents stored in the mobile phone 104 can be accessed with any of the SIM cards 101, 102 and 103. That is, there are no restrictions in accessing and using the user data stored in the mobile phone 104, if the SIM card inserted in the mobile phone is provided with an identical data format.

Accordingly, when the mobile phone 104 is lent to a friend or taken by an unauthorized person, the data stored in the mobile phone may be used in an unwanted manner.

For example, when DRM contents, which are protected so as to have a limited number of play times, are stored in the mobile phone 104, the unauthorized or accidental use of a DRM content file by a borrower may cause the file to run out of play times. Also, user data that a user desires to keep secure may be exposed to the borrower.

In the following exemplary embodiments, user data is protected from being unwantedly accessed or executed by assigning access/execution authentication to predetermined SIM cards and permitting access to and execution of the user data. The SIM cards can be assigned different access/execution authentication levels for a specific file such that the access and execution of a specific file is restricted to a SIM card that is assigned a low access/execution authentication level.

Figure 2:
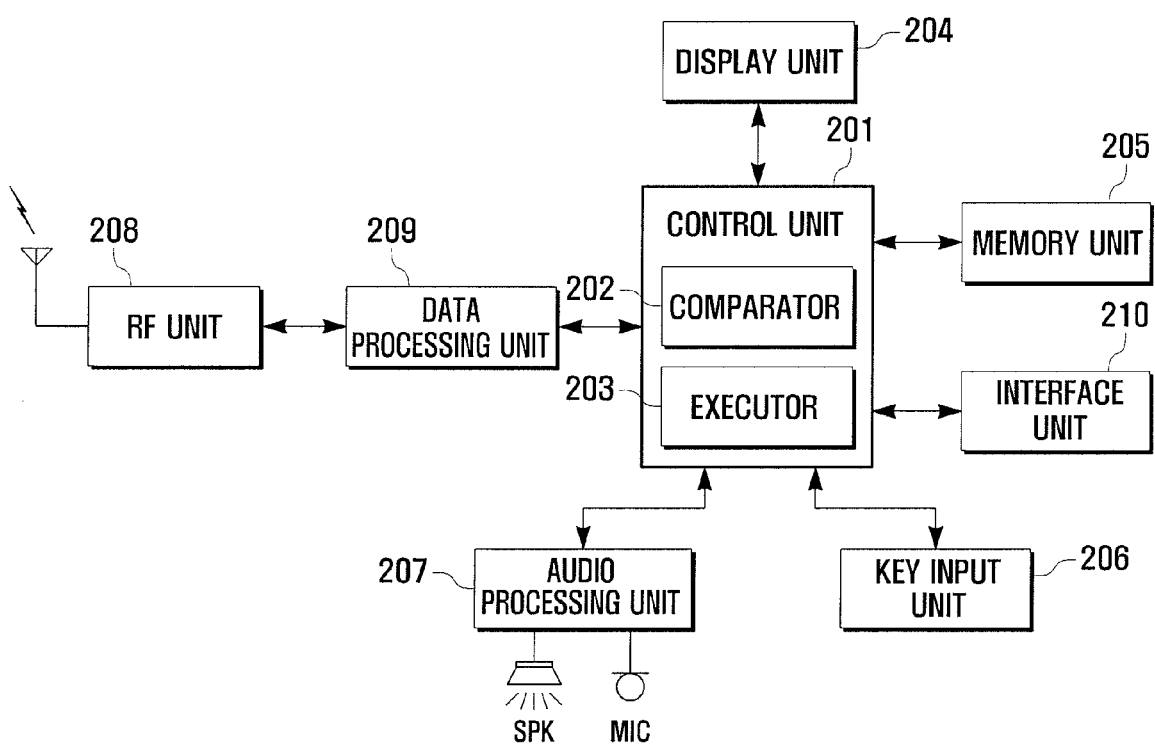
FIG. 2 is a block diagram illustrating a configuration of a mobile phone employing a data execution control system according to an exemplary embodiment of the present invention.

FIG. 2 is a block diagram illustrating a configuration of a mobile phone employing a data execution control system according to an exemplary embodiment of the present invention.

Referring to FIG. 2, the mobile phone includes a control unit 201, a display unit 204, a memory unit 205, a key input unit 206, an audio processing unit 207, a radio frequency (RF) unit 208, a data processing unit 209 and a SIM interface unit 210. The control unit 201 includes a comparator 202 and an executor 203.

The control unit 201 controls general operations of the mobile phone. That is, the control unit 201 controls the display unit 204, the memory unit 205, the key input unit 206, the audio processing unit 207 and the data processing unit 209. The control unit 201 also controls call setup and data communication with a base station. For example, the control unit 201 identifies, when an access/execution request is input for specific user data, the access/execution authentication level of the SIM card and determines whether to allow or deny the request on the basis of the access/execution authentication level. That is, the control unit 201 controls access to and execution of the user data stored in the mobile phone on the basis of the access/execution authentication level of the attached SIM card.

The control unit 201 registers the data to be protected from unwanted access and configures the access/execution level of the data. By registering the data and configuring the access/execution level, requests are only allowed by a SIM card assigned the minimum access/execution authentication level or above.

The control unit 201 can also configure the access/execution authentication level of the user data to have at least one execution password. The execution password is mapped to the user data such that the user can only execute the protected data in a restriction mode. In an exemplary implementation, the execution password is an identification number of the SIM card or a phone number corresponding to the SIM card.

The identification number or the phone number can be extracted from the attached SIM card and registered as the execution password. The execution password also can be registered by user input. As an example, the restriction mode and password configurations are performed through an administrator authentication procedure.

In order to perform the authentication procedure, the control unit 201 is provided with the comparator 202 and the executor 203.

If a request is input to access specific user data stored in the memory unit 205, the comparator 202 identifies the execution password (for example, SIM ID or phone number) obtained from the SIM card with reference to the previously registered execution passwords.

If it is determined that the execution password obtained from the SIM card is valid, the executor 203 allows access to the user data and executes the user data in response to the user input. On the other hand, if the execution password is invalid, the executor 203 rejects the access to the user data.

The display unit 204 may display a screen image generated in association with the operations of currently running applications and information input by a user. The display unit 204 also displays the multimedia images corresponding to the executed user data (for example, still and motion pictures). The display unit 204 can be implemented with a Liquid Crystal Display (LCD) integrating a touchscreen. In this case, the display unit 204 can be a part of input means.

The memory unit 205 stores various applications and application and user data generated when the application is running. The user data may include multimedia contents such as audio and video files. The multimedia contents may include DRM files and non DRM files including user-created files. The memory unit 205 also stores the setting parameters associated with the user data execution restriction mode and information on the SIM cards (including execution passwords)

The key input unit 206 may be provided with various alphanumeric and functions keys for receiving user input and transferring corresponding sequences to the control unit 201. The key input unit 206 can be implemented with at least one of a touchpad, a normal phone keypad and a QWERTY keypad. The key input unit 206 may also be provided with additional function keys such as navigation keys, volume keys and hot keys.

The RF unit 208 is responsible for radio communication of the mobile phone.

The data processing unit 209 is responsible for processing audio data from the audio processing unit 207, text data input through the key input unit 206 and signals input through the RF unit 208. The data processing unit 209 includes a transmission part for performing encoding and modulation on the signals to be transmitted and a reception part for performing demodulation and decoding on the signals received through the RF unit 208. The data processing unit 209 can incorporate a modem and a codec. The codec includes at least one of a data codec for processing data signals, an audio codec for processing voice signals and a video codec for processing video signals.

The audio processing unit 207 processes the audio data output by the data processing unit 209 so as to be output in the form of audible sound, for example through a speaker (SPK). Also, the audio processing unit 207 processes signals input through a microphone (MIC) to be appropriate for the data processing unit 209.

The SIM interface unit 210 provides the mobile phone with a SIM interface such that the SIM card can be attached to the mobile phone.

Although FIG. 2 illustrates internal elements associated with the basic operations and data execution control method of the present invention, the present invention is not limited to such configuration. For example, the mobile phone can further include at least one of a camera module, a Bluetooth module, a digital broadcast receiver module and the like.

Also, the present invention can be applied to various information processing devices that can be activated with multiple user (or subscriber) identity modules.

The information processing devices may include Code Division Multiple Access (CDMA) terminal, Wideband CDMA (WCDMA) terminal, CDMA 2000 terminal, multimedia player including MP3 player and Portable Multimedia Player (PMP), digital broadcast receiver, Personal Digital Assistant (PDA), Smartphone, and their equivalents.

An exemplary data execution control operation is described hereinafter in detail.

Figure 3:
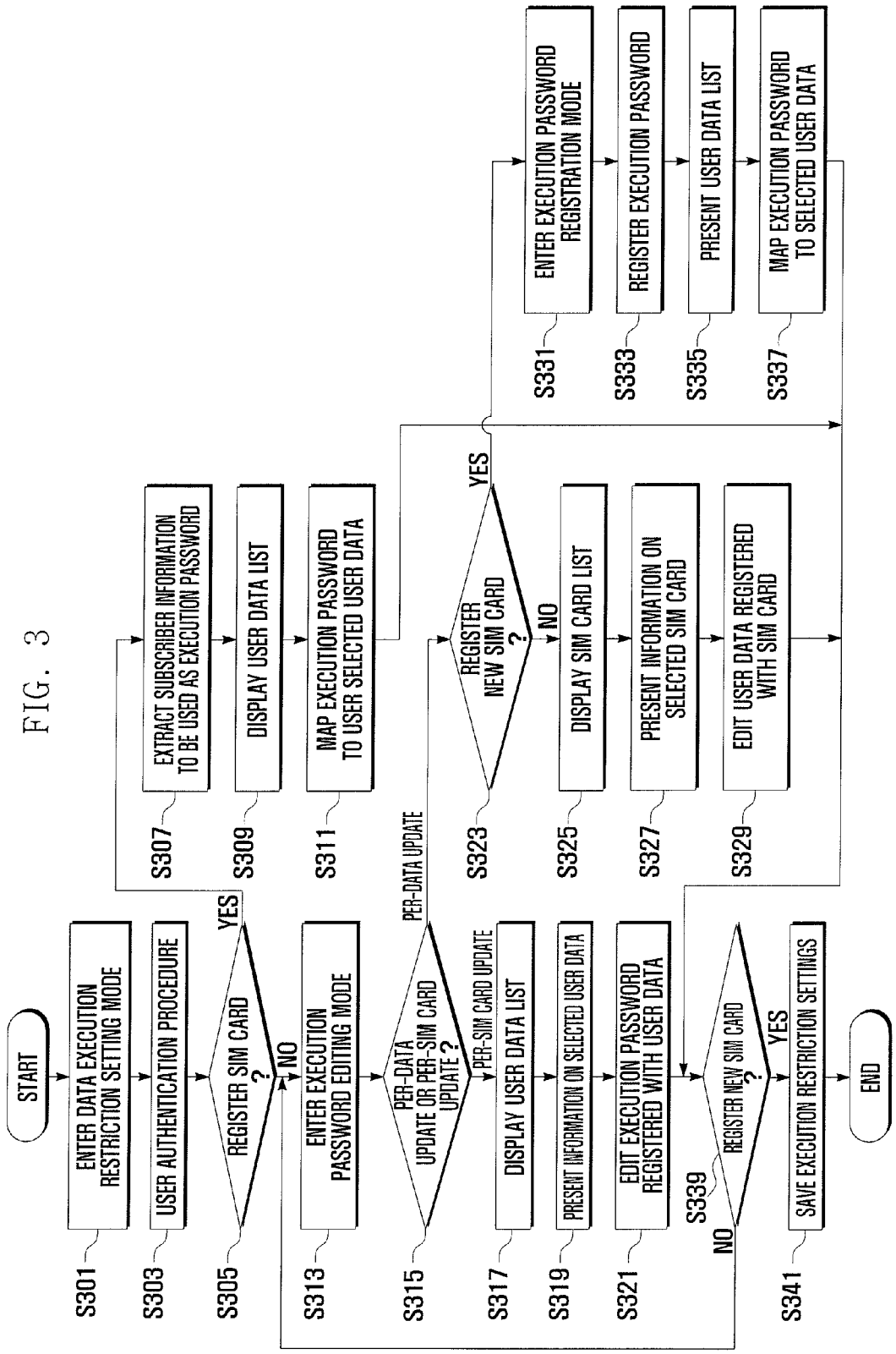
FIG. 3 is a flowchart illustrating a data execution control method for a mobile phone according to an exemplary embodiment of the present invention.

FIG. 3 is a flowchart illustrating a data execution control method for a mobile phone according to an exemplary embodiment of the present invention.

Referring to FIG. 3, the control unit 201 controls the mobile phone to enter a data execution restriction setting mode in response to a user command in step S301 and authorizes the user to configure the data execution restriction mode through a user authentication procedure in step S303. Through the user authentication procedure, the control unit 201 identifies the user as an administrator for protecting the mobile phone from illegal usage. The authentication procedure can be performed with various known authentication algorithms. Multiple users can be registered as the administrator.

If the user passes the authentication procedure, the control unit 201 detects a key input and determines whether the key input is for registering a new SIM card in step S305.

If it is determined that the key input is for a new SIM card registration, the control unit 201 extracts subscriber information to be registered as an execution password from the SIM card inserted to the mobile phone in step S307. The subscriber information can include at least one of the SIM ID and phone number embedded in the SIM card. In an exemplary implementation, the mobile phone is configured to automatically register the SIM ID or phone number when the user passes the authentication procedure with a new SIM card.

After extracting the subscriber information, the control unit 201 controls to display a user data list in step S309. That is, the control unit 201 controls the display unit 204 to display a user data list such that the user can configure the security level of each user data item. The user data items can be wholly listed on the display screen or displayed by category or by user. The security level can be set by user data and category for each SIM card.

While displaying the user data list, the control unit 201 registers the user data items selected by the user with the execution password, i.e. the SIM ID or phone number extracted from the attached SIM card in step S311. Table 1 is an exemplary SIM-data mapping table which lists the user data items by SIM card.

TABLE 1

| User data | Execution Password (SIM ID) | Execution Password (Phone number) | Execution Restriction |
|---|---|---|---|
| User Data 1 | SIM ID #1<br>SIM ID #2<br>SIM ID #4 | 01011111111 | ON |
| User Data 2 |  | 01022222222<br>01033333333 | OFF |
| Message Box | SIM ID #1<br>SIM ID #3 | 01011111111<br>01033333333 | ON |
| Album | SIM ID #4 | 01044444444<br>01055555555 | OFF |
| MP3 File Box | SIM ID #1 |  | ON |
| Contents Box | SIM ID #3 |  | OFF |

As shown in table 1, the SIM-data mapping table is provided with a user data field, two types of execution password fields and an execution restriction field.

The user data field lists the user data items registered for the execution restriction mode. The user data items represent respective user data and data categories stored in the memory unit.

One of the execution password fields lists the SIM IDs permitted to access each user data or data category. The other execution password field lists the phone number permitted to access each user data or data category. A SIM card can be registered for a specific user data or data category with at least one of the SIM ID and phone number as the execution password. Although both the SIM ID and phone number fields are shown in table 1, the mapping table can be structured with only one of the SIM ID and phone number fields.

The execution restriction field shows whether the execution restriction option for each user data or data category is enabled or disabled. By enabling or disabling the execution restriction option, it is possible to manage the access to the user data by category.

According to an exemplary embodiment of the present invention, the mobile phone can be configured to enable or disable the data execution restriction mode. If the data execution restriction mode is enabled, the mobile phone controls access to the user data with reference to the SIM-data mapping table as shown in table 1. On the other hand, if the data execution restriction mode is disabled, the user data stored in mobile phone can be accessed and executed using respective SIM cards.

During the process of mapping the user items to the execution password at step S311, the control unit 201 determines whether a key input for completing the SIM-data mapping table update is detected in step S339. If a SIM-data mapping table update completion key input is detected, the control unit 201 saves the updated SIM-data mapping table in step S341. If no SIM-data mapping table update completion key input is detected, the control unit 201 controls the mobile phone to enter an execution password editing mode in step S313.

Returning to step S305, if it is determined that the key input is not for a new SIM card registration, the control unit 201 controls the mobile phone to enter the execution password editing mode in step S313. Once the mobile phone enters the execution password editing mode, the control unit 201 detects a key input and determines whether the key input is for a per-data update request or a per-SIM card update request in step S315. The update may be performed by removing, modifying and/or adding execution passwords.

If a per-data update request is detected, the control unit 201 controls to display a user data list in step S317. The user data list includes user data items and data categories (or data groups). The user data list can be provided such that the items are presented entirely at a time or by category.

Next, the control unit 201 detects whether a user data item is selected by the user and presents, if a user data is selected, information on the selected user data in step S319. The information includes user data information associated with the data itself and the subscriber information (including SIM ID and/or phone number) of the SIM card with the access/execution authentication level. The user data information may include a data name, data category, size, DRM information and the like. If the data is not registered for the execution restriction mode, the subscriber information can be omitted.

While the information is presented, the control unit 201 edits the execution passwords mapped to the user data in response to the user's key manipulation in step S321. Editing the execution passwords may include adding a new execution password and modifying and deleting the previously registered execution password.

If a per-SIM card update request is detected, the control unit 201 detects a key input and determines whether the key input is for registering a new SIM card in step S323.

If the key input is not for registering a new SIM card, the control unit 201 controls to display a registered SIM card list in step S325. The SIM cards on the list are assigned different access/execution levels relative to the respective user data and data categories.

While the SIM card list is displayed, the control unit 201 detects a key input for selecting a SIM card on the list and presents, if a SIM card is selected, information on the selected SIM card in step S327. The information may include basic information on the SIM card and the access permission information to the user data and data categories. The basic information may include the SIM ID and phone number embedded within the SIM card.

Next, the control unit 201 edits the access/execution level of the SIM card to the respective user data and data categories in step S329. Editing the access/execution level of the SIM card includes adding and deleting user data from a permitted data list and modifying the access/execution level to the user data.

If the key input is for registering a new SIM card in step S323, the control unit 201 controls the mobile phone to enter an execution password registration mode in step S331. In the execution password registration mode, at least one of the SIM ID and phone number embedded within the SIM card are registered as the execution password.

Once the mobile phone enters the execution password registration mode, the control unit 201 registers an execution password in response to a user request in step S333. In an exemplary implementation, the execution password can be registered by user input or by automatically extracting the SIM ID and/or phone from the attached SIM card.

If the execution password is successfully registered, the control unit 201 controls to display the user data list in step S335. The control unit 201 allows the user to assign the access/execution authentication levels to the execution password (i.e. the SIM card) for respective user data and categories listed on the user data list.

While the user data list is displayed, the control unit 201 maps the user data and data categories selected from the user data list to the execution password in step S337 (see table 1).

Next, the control unit determines whether a key input for ending the execution restriction setting mode is detected in step S339 and saves, if a SIM-data mapping table update completion key input is detected, the execution restriction settings in step S341. If no SIM-data table update completion key is detected, the control unit 201 controls the mobile phone to enter an execution password editing mode in step S313 and the process continues as described above.

Figure 4:
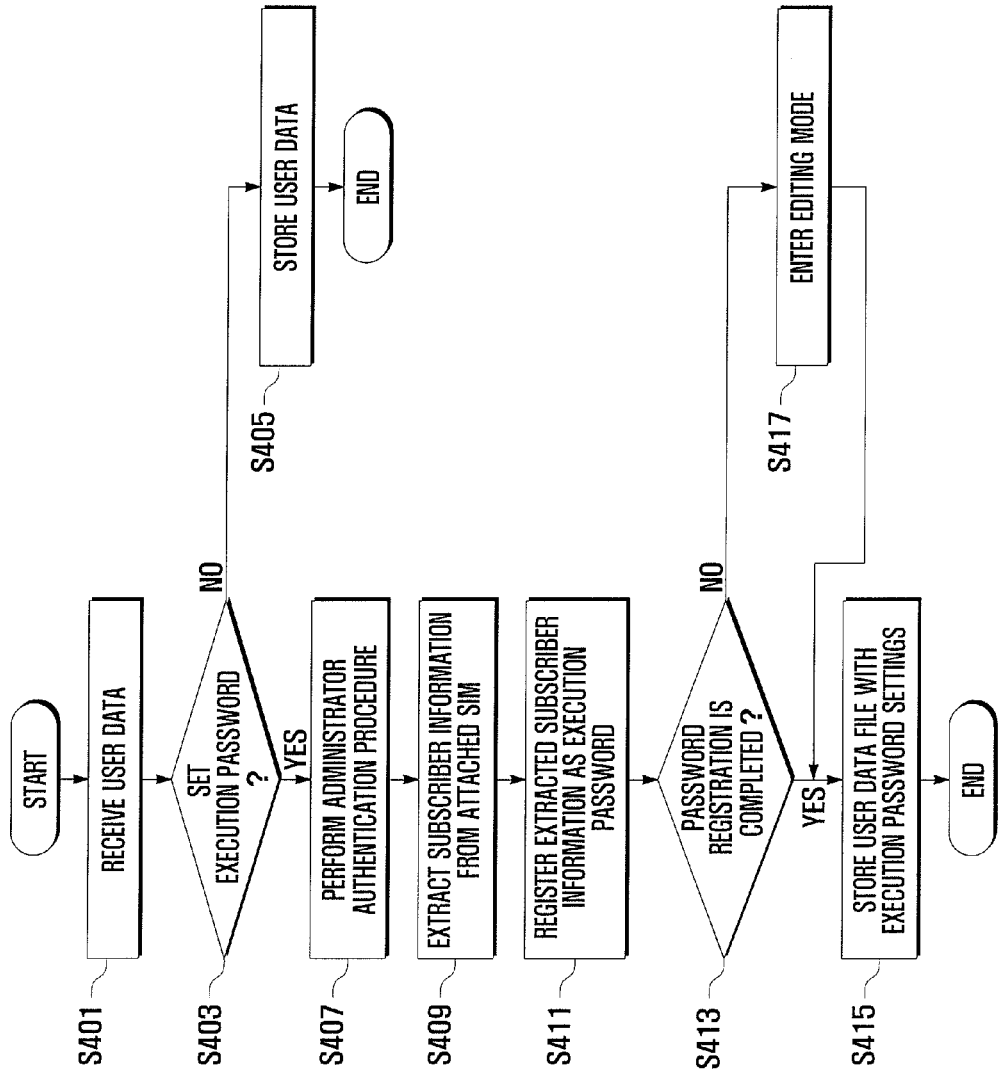
FIG. 4 is a flowchart illustrating an execution password setting procedure of a data execution control method according to an exemplary embodiment of the present invention.

FIG. 4 is a flowchart illustrating an execution password setting procedure of a data execution control method according to an exemplary embodiment of the present invention.

In an exemplary embodiment, it is assumed that the mobile phone is activated by a new SIM card and new user data is received from an external source. The user data may include personal files such as text and picture files generated by the user and multimedia content files received from an external source. The multimedia content files can be downloaded from a server across networks including the Internet and cellular networks or received from an external device through a wired or wireless communication channel.

The user data may include text files, audio files, still and motion picture files and the like. Furthermore, some or all of these files may be DRM protected.

After the mobile phone is activated with a SIM card, the control unit receives a user data file in step S401. If the user data file is completely received, the control unit 201 determines whether an execution password setting request is input for the user data file in step S403. If no execution password setting request is input, the control unit processes the user data file according to a predetermined procedure. For example, the control unit stores the user data file in response to a save command in step S405.

If an execution password setting request input is detected, the control unit performs an administrator authentication procedure for the attached SIM card in step S407. During the administrator authentication procedure, the control unit determines whether the user is permitted to perform the execution password setting.

If the user passes the administrator authentication procedure, the control unit extracts the execution password from the SIM card in step S409. The execution password extraction is performed as described with reference to FIG. 3. Although FIG. 4 shows that the execution password is extracted from the SIM card, the execution password also can be obtained by user input or by selecting one of the previously registered execution passwords.

After the execution password is obtained, the control unit 201 registers the subscriber information as the execution password to the received user data file and configures the access/execution authentication level of execution password to the user data file in step S411. That is, the control unit registers the execution password such that the user data can be executed with the execution password (see table 1).

Next, the control unit 201 determines whether an execution password registration completion request is input in step S413. If an execution password registration completion request is input, the control unit stores the user data file together with the execution password settings in step S415. If no execution password registration completion request is input, the control unit controls the mobile phone to enter an editing mode according to a user request in step S417. In the editing mode, the user data and execution password can be processed in various manners.

Figure 5:
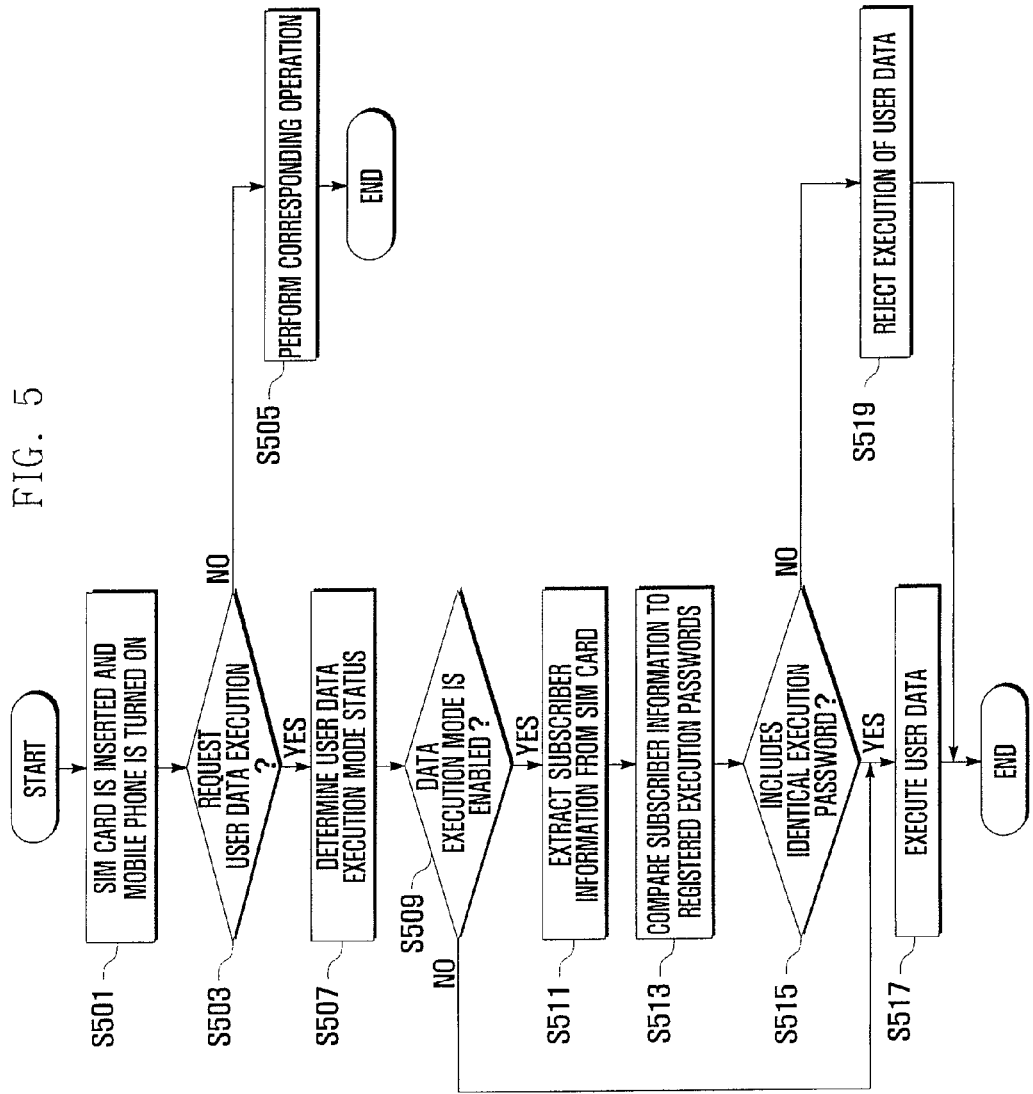
FIG. 5 is a flowchart illustrating a user data execution procedure of a data execution control method according to an exemplary embodiment of the present invention.

FIG. 5 is a flowchart illustrating a user data execution procedure of a data execution control method according to an exemplary embodiment of the present invention.

Referring to FIG. 5, once a SIM card is inserted into the mobile phone and the mobile phone is turned on in step S501, the control unit 201 detects a key input and determines whether the key input is for executing a specific user data file in step S503.

If the key input is not for executing a specific user data file, the control unit 201 performs an operation corresponding to the key input in step S505. For example, if it is determined that the key input is for making a call, the control unit transmits a call request.

If the key input is for executing a specific user data file, the control unit 210 determines the status of the data execution mode of the mobile phone in step S507 and determines whether the data execution restriction mode is enabled in step S509.

If the data execution restriction mode is disabled, the control unit 201 executes the user data file in response to the user request in step S517.

If the data execution restriction mode is enabled, the control unit 201 extracts the subscriber information in step S511. The subscriber information may include the SIM ID, the phone number embedded within the attached SIM card and the like.

In the data execution restriction mode, access to the user data stored in the mobile phone is restricted such that the only users who own or otherwise control the SIM cards that are previously registered for the mobile phone can access and execute the user data.

The subscriber information can be obtained by user input, i.e. by inputting one of the SIM ID and phone number.

If the subscriber information is obtained from the SIM card, the control unit 201 compares the subscriber information to the previously registered execution passwords in step S513 and determines whether the subscriber information includes an execution password in step S515.

If the subscriber information includes a registered execution password, the control unit 201 executes the user data requested by the user in step S517. If the subscriber information does not include a registered execution password, the control unit 201 rejects executing the user data requested by the user in step S519. In this case, the control unit 201 may output an announcement message informing that the user is not permitted to access the requested user data.

Figure 6:
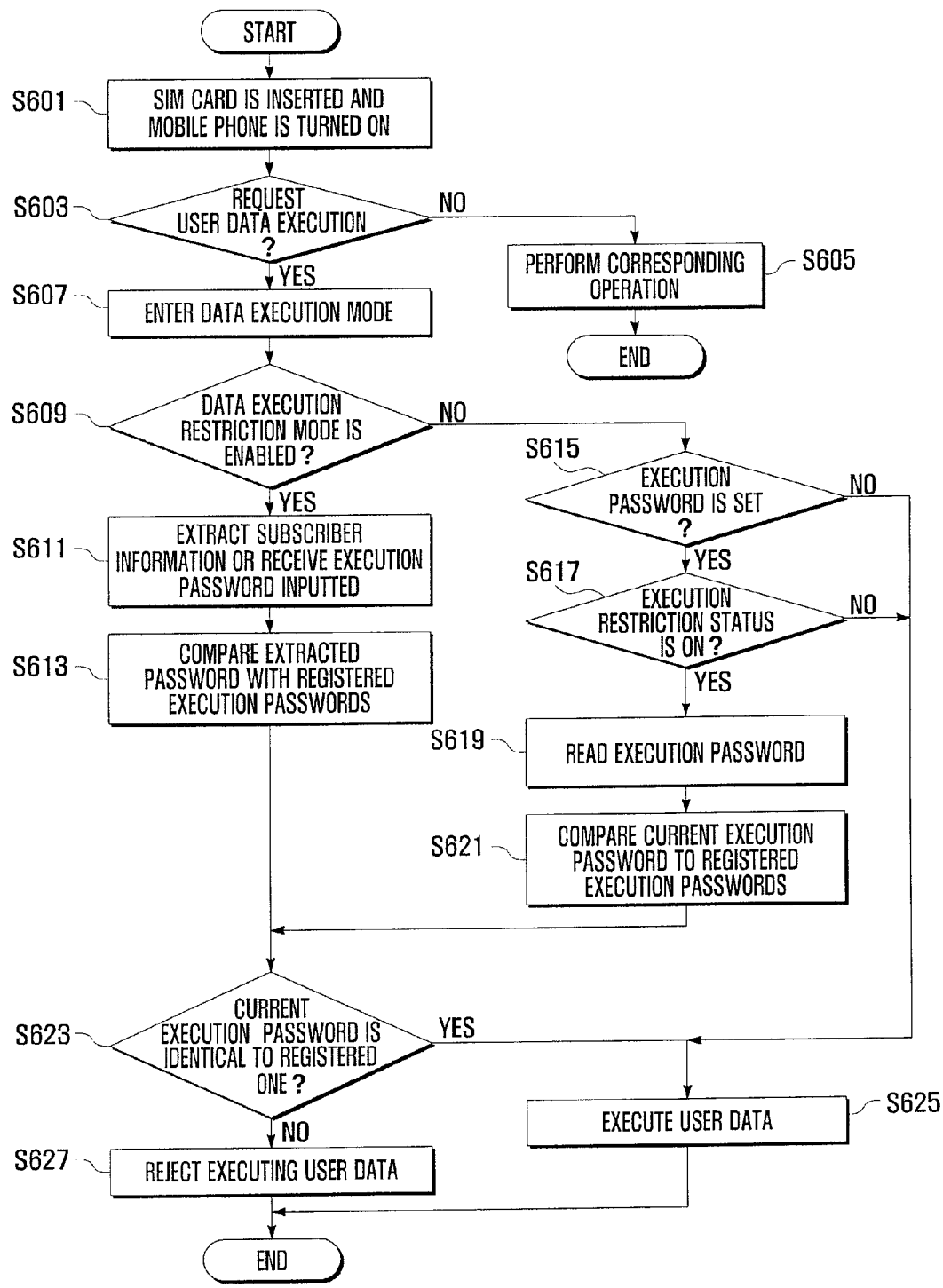
FIG. 6 is a flowchart illustrating a user data execution procedure of a data execution control method according to another exemplary embodiment of the present invention.

FIG. 6 is a flowchart illustrating a user data execution procedure of a data execution control method according to another exemplary embodiment of the present invention.

Referring to FIG. 6, once a SIM card is inserted into the mobile phone and the mobile phone is turned on in step S601, the control unit 201 detects a key input and determines whether the key input is for executing a specific user data file in step S603.

If the key input is not for executing a specific user data file, the control unit 201 performs an operation corresponding to the key input in step S605. For example, the key input can be a call setup request.

If the key input is for executing a specific user data file, the control unit 201 controls the mobile phone to enter a data execution mode in step S607 and then determines whether the data execution restriction mode is enabled in step S609. In the data execution restriction mode, access to the user data stored in the mobile phone is restricted in accordance with the preset access/execution authentication levels assigned to the SIM cards.

If the data execution restriction mode is enabled, the control unit 201 collects an execution password by reading corresponding information from the SIM card attached to the mobile phone or by receiving the execution password (SIM ID or phone number) input by the user in step S611. Next, the control unit 201 compares the collected execution password to the previously registered execution passwords in step S613 and determines whether an identical execution password is retrieved in step S623.

If FIG. 6, the data execution restriction mode is configured such that user data execution is permitted only if the execution password is identified at step S613.

However, the execution restriction mode can be configured such that, if an identical execution password is retrieved as a result of the comparison, the control unit 201 controls the execution of the user data according to whether the execution password is allowed to execute the target user data or not. This means that different SIM cards are assigned different levels of data execution authorization such that a SIM card can be allowed to execute the specific user data but not all user data stored in the mobile phone. That is, the user data can be doubly protected.

Returning to step S609, if the data execution restriction mode is disabled, the control unit 201 determines whether an execution password is set for the user data in step S615. If no execution password is set for the user data, the control unit 201 executes the user data in step S625. On the other hand, if an execution password is set for the user data, the control unit 201 determines whether the execution restriction status of the user data is on or off as in table 1 in step S617.

If the execution restriction status of the user data is off, the control unit 201 executes the user data in step S625. On the other hand, if the execution restriction status of the user data is on, the control unit 201 collects the execution password from the SIM card or by receiving user input in step S619. Next, the control unit 201 compares the collected execution password with the execution passwords registered to the user data in step S621 and determines whether the current execution password is identical with at least one registered execution password in step S623.

If an identical execution password is retrieved, the control unit 201 executes the user data in step S625 and, otherwise, rejects executing the user data in step S627. In a case that the access to the user is denied, the control unit 201 may output an alert message announcing that the SIM card has no access authorization to the target user data.

In FIG. 6, the user data restriction operation is performed according to whether the user data restriction mode is enabled or disabled. However, the user data restriction operation can be performed such that, if a user data execution request key is detected in step S603, the control unit 201 determines the execution password in step S615 and controls data execution according to following steps. In this case, steps S607 to S613 of FIG. 6 can be omitted.

As described above, the data execution control method of the present invention assigns different levels of data execution authorization to SIM cards such that the user data stored in the mobile phone can be protected from being wontedly executed by an unauthorized user.

The data execution control method of the present invention registers specific user data with information on the SIM cards that are authorized to execute the user data, whereby the user data can be protected from execution attempts using unauthorized SIM cards. Also, the data execution control method of the present invention provides double authentication procedures such that the SIM card should pass the restriction mode authentication and data execution authentication, resulting in improvement of user data protection.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

The data execution control method and system for a mobile phone according to exemplary embodiments of the present invention allow registering SIM IDs and phone numbers embedded within SIM cards as per-user data execution passwords, whereby the user data stored in the mobile phone shared by multiple users can be effectively protected from being unwantedly accessed and executed.

Also, the data execution control method and system for a mobile phone according to exemplary embodiments of the present invention can assign access/execution authorization for specific user data by SIM card, whereby the user data can be shared by owners of the SIM cards having the access/execution authorization and protected from illegal usage.

What is claimed is:

1. A data execution control method for a mobile phone comprising specific user data and activated by a Subscriber Identity Module (SIM), the method comprising:

receiving a key input requesting an execution of the specific user data;

reading subscriber information from the SIM and an execution password included in the subscriber information stored in the SIM;

determining whether the execution password stored in the SIM is identical with a previously registered execution password for the specific user data on the mobile phone; and executing the specific user data if the execution password stored in the SIM is identical with the previously registered execution password for the specific user data, wherein each specific user data may separately have one or more execution passwords associated therewith, each associated execution password authorizing the execution of the specific user data.

2. The data execution control method of claim 1, the method comprising:

determining, after the execution request for the specific user data is input, whether a data execution restriction mode is enabled;

executing, if the data execution restriction mode is not enabled, the specific user data;

comparing, only if the data execution restriction mode is enabled, the execution password stored in the SIM and the previously registered execution passwords;

executing, if the execution password stored in the SIM is identical with the previously registered execution passwords, the specific user data; and rejecting, if the execution password stored in the SIM is not identical with the previously registered execution passwords, execution of the specific user data.

3. The data execution control method of claim 2, wherein the subscriber information comprises at least one of a SIM identity number and a phone number embedded within the SIM.

4. The data execution control method of claim 2, wherein the execution password includes at least one of a SIM identity number and a phone number embedded within at least one SIM.

5. The data execution control method of claim 2, further comprising:
determining, if the execution password stored in the SIM is identical with the previously registered execution password, whether the execution password is authorized for executing the specific user data;
executing, if the execution password is authorized for executing the specific user data, the specific user data; and
rejecting, if the execution password is not authorized for executing the specific user data, execution of the specific user data.

6. The data execution control method of claim 2, further comprising:
determining, if the data execution restriction mode is disabled, whether the specific user data is registered with at least one execution password;
determining, if the specific user data is registered with the at least one execution password, whether the subscriber information matches the at least one execution password;
executing, if the subscriber information matches the at least one execution password, the specific user data; and
rejecting, if the subscriber information does not match the at least one execution password, execution of the specific user data,
wherein each specific user data may separately have one or more subscriber information associated therewith, each associated subscriber information authorizing the execution of the specific user data.

7. A data execution control method for a mobile phone comprising specific user data and activated by a Subscriber Identity Module (SIM), the method comprising:
determining, if an execution request for the specific user data is input, whether a data execution restriction mode is enabled;
determining, if the data execution restriction mode is enabled, whether one of execution passwords stored in the SIM is identical with a first execution password for the specific user data previously registered on the mobile phone, the execution passwords being included in subscriber information stored in the SIM;
determining, if one of the execution passwords stored in the SIM is identical with the first execution password for the specific user data, whether one of the execution passwords stored in the SIM is identical with a second execution password for the specific user data previously registered on the mobile phone; and
executing, if one of the execution passwords stored in the SIM is identical with the second execution password for the specific user data, the specific user data,
wherein each specific user data may separately have a data execution restriction mode associated therewith, and
wherein each specific user data may separately have first and second execution passwords associated therewith for authorizing the execution of the specific user data.

8. The data execution control method of claim 7, wherein the determining of whether one of the execution passwords stored in the SIM is identical with the first execution password comprises:
comparing one of the execution passwords stored in the SIM to the first password previously registered on the mobile phone;
permitting, if one of the execution passwords stored in the SIM is identical with the first password for the specific user data, execution of the specific user data; and
rejecting, if none of the execution passwords stored in the SIM is identical with the first password, execution of the specific user data.

9. The data execution control method of claim 8, wherein the determining of whether one of the execution passwords stored in the SIM is identical with the second execution password comprises:
comparing one of the execution passwords stored in the SIM to the second password previously registered to the specific user data on the mobile phone;
executing, if one of the execution passwords stored in the SIM is identical with the second password, the specific user data; and
rejecting, if none of the execution passwords stored in the SIM is identical with the second password, execution of the specific user data.

10. The data execution control method of claim 7, wherein the determining of whether one of the execution passwords stored in the SIM is identical with the second execution password comprises:
determining, if the data execution restriction mode is disabled, whether the specific user data is registered with at least one second execution password;
determining, if the specific user data is registered with the at least one second execution password, whether a restriction status of the specific user data is on or off;
collecting, if the restriction status of the specific user data is on, the subscriber information including the execution passwords stored in the SIM from the SIM;
determining whether one of the execution passwords stored in the SIM is identical with the at least one second execution password; and
executing, if one of the execution passwords stored in the SIM is identical with the at least one second execution password, the specific user data.

11. The data execution control method of claim 10, wherein the determining of whether one of the execution passwords stored in the SIM is identical with the second execution password further comprises rejecting, if none of the execution passwords stored in the SIM is identical with the at least one second execution password, execution of the specific user data.

12. A data execution control method for a mobile phone comprising specific user data and activated by a Subscriber Identity Module (SIM), the method comprising:
determining, if an execution request for a specific user data is input, whether at least one execution password is registered to the specific user data on the mobile phone;
determining, if the at least one execution password is registered to the specific user data, whether a restriction status of the specific user data is enabled;
executing, if the restriction status of the specific user data is not enabled, the specific user data;
collecting, if the restriction status of the specific user data is enabled, subscriber information including an execution password from the SIM;

determining whether the execution password stored in the SIM is identical with the at least one execution password registered to the specific user data;

executing, if the execution password stored in the SIM is identical with the at least one execution password registered to the specific user data, the specific user data; and rejecting, if the execution password stored in the SIM is not identical with the at least one execution password registered to the specific user data, execution of the specific user data.

13. A data execution control method for a mobile phone comprising user data and activated by a Subscriber Identity Module (SIM), comprising:

determining, if a key input is detected while the mobile phone operates in a data execution restriction mode, whether the key input comprises a SIM registration mode request;

collecting, if the key input comprises a SIM registration mode request, subscriber information;

registering the subscriber information as an execution password for executing at least one user data selected by a user input;

entering, if the key input does not comprise a SIM registration mode request, an execution password editing mode including at least one of a per-user data option and a per-SIM option for selection;

displaying, if the per-user data option is selected, a user data list comprising the user data registered for the data execution restriction mode;

editing at least one execution password registered to the user data selected from the user data list in response to user input;

displaying, if the per-SIM option is selected, a SIM list comprising subscriber information items registered for the data execution restriction mode; and editing the user data registered to the subscriber information selected from the SIM list.

14. The data execution control method of claim 13, wherein the subscriber information comprises at least one of a SIM IDentification (ID) and a phone number embedded within the SIM inserted to the mobile phone.

15. The data execution control method of claim 13, wherein the execution password represents at least one of a SIM IDentification (ID) and a phone number embedded within the SIM inserted to the mobile phone.

16. The data execution control method of claim 13, wherein the collecting of the subscriber information comprises at least one of reading from the SIM inserted from the mobile phone and receiving at least one a SIM IDentification (ID) and a phone number input by a user.

17. The data execution control method of claim 13, wherein the editing of the at least one execution password comprises modifying and deleting at least one execution password registered to the user data and registering a new execution password to the user data.

18. The data execution control method of claim 13, wherein the editing of the user data comprises modifying and deleting at least one user data registered to the execution password and registering a new user data to the execution password.

19. The data execution control method of claim 13, further comprising determining an authentication of the SIM for entering the data execution restriction mode.

20. The data execution control method of claim 13, further comprising:

determining, if a user data is created, whether an execution password registration is requested for the user data;

collecting, if the execution password registration is requested for the user data, subscriber information from the SIM; and registering the subscriber information to the user data as the execution password.

21. The data execution control method of claim 20, wherein the user data is at least one of received from a server across at least one wireless network and generated within the mobile phone.

22. A mobile phone activated by a Subscriber Identity Module (SIM), the mobile phone comprising:

a SIM interface;

a memory unit for storing specific user data and corresponding execution setting information; and a control unit for registering at least one password corresponding to the specific user data and for controlling execution of the specific user data by comparing an execution password stored in the SIM with the at least one password corresponding to the specific user data, wherein the SIM is connected through the SIM interface, and the execution password stored in the SIM is included in subscriber information stored in the SIM, and wherein each specific user data may separately have one or more execution passwords associated therewith, each associated execution password authorizing the execution of the specific user data.

23. The mobile phone of claim 22, wherein the control unit collects, if an execution of the specific user data is requested, the subscriber information including the execution password stored in the SIM and executes, if the execution password stored in the SIM is identical with the execution password registered for executing the specific user data, the specific user data.

24. The mobile phone of claim 23, wherein the subscriber information comprises at least one of a SIM IDentification (ID) and a phone number embedded within the SIM and is collected by at least one of reading from the SIM and receiving a user input.

25. The mobile phone of claim 24, wherein the control unit comprises:

a comparator for comparing the SIM ID and phone number read from the subscriber information to the at least one password corresponding to the specific user data; and an executor for executing the specific user data if at least one of the SIM ID and phone number is identical with the at least one of the password.

* * * * *